Patented Dec. 25, 1951

2,580,047

UNITED STATES PATENT OFFICE 2,580,047

PREPARATION OF IMIDO ESTERS FROM AZOLINES AND MALEIC ADDUCTS OF FATTY ACID ESTERS

Stanley P. Rowland, Philadelphia, Pa., assignor to Rohm & Haas Company, Philadelphia, Pa., a corporation of Delaware No Drawing. Application March 1, 1950, Serial No. 147,147

15 Claims. (Cl. 260—326.5)

This invention relates to a new class of imido-esters and to a process of preparing them.

The products of this invention are imido-esters of high molecular weight, and in many cases they are polymeric. They are made by reacting azolines; that is, oxazolines or thiazolines, with maleic anhydride-adducts of the esters of non-conjugated, non-hydrolyzed, unsaturated, aliphatic, carboxylic acids, which acids contain 10 to 24 carbon atoms.

It is known that maleic anhydride, as well as other alpha,beta-unsaturated anhydrides of dicarboxylic acids, such as citraconic anhydride, combines with the esters of non-conjugated, non-hydroxylated, unsaturated fatty acids, presumably at the double bonds, to form compounds known as maleic-adducts or maleic anhydride-adducts. As a result of this combination, anhydride groups are introduced into the fatty acid portion of the ester and the number of such added anhydride groups depends primarily upon the degree of unsaturation of the esterified fatty acid and the amount of maleic anhydride employed. Thus, for example, only one anhydride group can be added to each molecule of methyl oleate whereas more than one can be added to such esters as ethylene glycol dioleate, ethyl linolenate, glyceryl linolenate, pentaerythrityl undecenylate. Ordinarily, it becomes increasingly difficult to add each successive anhydride group but adducts can be readily prepared which contain up to at least two anhydride groups on each radical of esterified polyunsaturated acid.

This invention is not drawn to the preparation of the maleic-adducts since methods of making them are already well-established (cf. U. S. Patents Nos. 2,188,882 to 2,188,890 inclusive; "Paint, Oil and Chemical Review," vol. 112, No. 14 (July 7, 1949), p. 20; "Journal of American Oil Chemists' Soc.," vol. XXVI, No. 11 (November 1949), pp. 660–63 and vol. XXV, No. 5 (May 1948), pp. 158–62 and the bibliographies therein). Thus, for example, they are prepared by heating an ester of an unsaturated acid with maleic anhydride for about three to six hours at about 200° C. This invention is, however, drawn to the reaction of those adducts with azolines to produce new and distinctive imido-esters. This new reaction takes place between the anhydride portion or grouping in the maleic adduct and the azoline according to the following schematic representation, in which the azoline is shown in its skeletal form

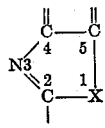

where X is an atom of oxygen or sulfur, and in which the anhydride portion of the adduct is shown as

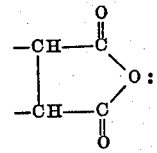

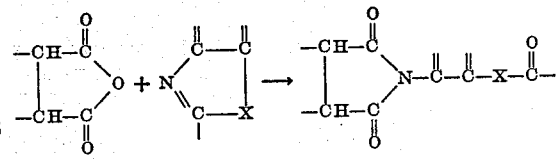

The reaction may be better understood from the following representation of the reaction between the anhydride group in an adduct and a particular azoline; namely, 2-heptadecadienyl-5-methyloxazoline:

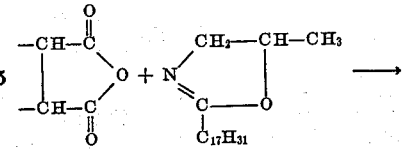

As would be expected, the new imido-esters have properties which are quite unlike those of the azolines or adducts from which they are made. These properties make the new compounds very useful as surface-coatings, as plasticizers, as additives for lubricating oils and as chemical intermediates, for example.

The oxazolines and thiazolines which react with the maleic-adducts are known, although it was not known heretofore to make new imido-esters of high molecular weight by reacting these azolines with the adducts. All of the reactive azolines have the general formula

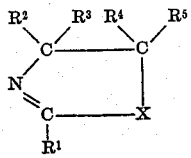

in which X is an atom of sulfur or oxygen; the characters $R^2$, $R^3$, $R^4$ and $R^5$ represent hydrogen atoms or monovalent, organic radicals which are unreactive with acid anhydrides and which, therefore, are free of alcoholic hydroxyl groups and amino-hydrogen atoms, and which preferably are hydrocarbon groups; and in which $R^1$ also represents the same kind of monovalent, organic radicals as do $R^2$ to $R^5$ but does not represent a hydrogen atom.

The organic radicals which are represented by R's$^1$ to $^5$ must be unreactive with acid anhydrides. Whether a particular substituent is reactive with acid anhydrides is well within the knowledge of one skilled in chemistry. That is, R's$^1$ to $^5$ must be entirely free of such substituents as hydroxy groups and amino hydrogen atoms which are capable of reacting with acid anhydrides, so that no interfering side-reactions can take place. It is preferred that these radicals be hydrocarbon radicals such as alkyl, aryl, alkaryl, aralkyl and cycloalkyl groups. The following list includes examples of such suitable hydrocarbons radicals: Methyl, ethyl, isopropyl, sec.-butyl, tert.-amyl, 2-ethylhexyl, lauryl, n-tetradecyl and octadecyl groups and the isomers of these groups; phenyl, tolyl, benzyl, p-octylphenyl, m-xylyl, 2,4-di-tert.-amyl phenyl; cyclohexyl; and naphthyl groups. In addition, the hydrocarbon group which is represented by $R^1$ can be unsaturated. In fact, a particularly valuable group of products are those in which $R^1$ is unsaturated. Such products have the added advantage of being more reactive and subject to oxidation and polymerization due to their unsaturation.

Although those reactants are preferred in which the substituents represented by the R's are hydrocarbons, it is a fact that the products of this invention are readily prepared from the azolines in which the substituents R's$^1$ to $^5$ also contain other elements in addition to carbon and hydrogen. Thus, halogen groups may be present in the R-substituents as well as nitro, ether, keto, aldehydo, sulfonic, carboxyl, or tertiary amine groups.

A large class of operable oxazolines and thiazolines are known and are shown in the literature. All of these react with the above-described adducts by the methods set forth in the examples below. All that is required is to substitute an equivalent amount of one azoline; i. e., an oxazoline or a thiazoline, for the particular azolines shown in the examples. Thus, in the same manner, the following azolines, of which the skeletal structure is

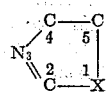

and in which X is an oxygen atom in oxazolines or a sulfur atom in thiazolines, combine in equimolecular amounts with the anhydride groups in the maleic anhydride adducts to form the new imido-esters of this invention: 2-phenyl azolines; 2-p-tolyl azolines; 2-o-tolyl azolines; 2-benzyl azolines; 2-(o-, m-, and p-nitrophenyl) azolines; p-chlorobenzyl azolines; 2-undecyl-5-chloromethyl azolines; 2,4-diphenyl azolines; 2,5-diphenyl azolines; 2-phenyl-5-chloromethyl azolines; 2-p-nitrophenyl-5-chloromethyl azolines; 2-(p-nitrophenyl)-5-diethylaminomethyl azolines; 2-(p-nitrophenyl)-5-dibutylaminomethyl azolines; 2-phenyl-5,5-dimethyl azolines; 2-phenyl-5-phenyl-5-methyl azolines; 2-(m- and p-nitrophenyl)-5,5-dimethyl azolines; 2-(alpha- or beta-naphthyl) azolines; 2-p-methoxyphenyl azolines; 2-p-ethoxyphenyl azolines; 2-p-butoxyphenyl azolines; 2-(m-nitro-p-methoxyphenyl) azolines; 2-(p-nitrophenyl)-4-butyl azolines; 2-(p-nitrophenyl)-4-phenylazolines; 2-phenyl-5-methyl azolines; 2-phenyl-5-ethyl azolines; 2-benzyl-5-methyl azolines; 2-styryl-5-methyl azolines; 2-(o- and p-tolyl)-5-methyl azolines; 2-(alpha- and beta-naphthyl)-5-methyl azolines; 2-phenyl-4,5-dimethyl azolines; 2-(p-nitrophenyl)-4,5-dimethyl azolines; 2-phenyl-4-methyl-5-ethyl azolines; 2,4,5-trimethyl azolines; 2-undecyl-4,4-dimethyl azolines; 2-phenyl-4-methyl-4-ethyl azolines; 2-phenyl-4,4-dimethyl azolines; 2-heptadecyl azolines; 2-heptadecenyl azolines; 2-heptadecyl-4,4-dimethyl azolines; 2-heptadecenyl-5-ethyl azolines; 2-methyl-4,5-diphenyl azolines; 2-methyl-4,5,5-triphenyl azolines; 2-phenyl-4-methyl-5-phenyl azolines; 2-methyl-4,5,5-triphenyl azolines; 2-phenyl-4-methyl-5,5-dibenzyl azolines; 2-heptadecyl-5-diethylaminomethyl azolines; 2-heptadecyl-5-ethyl azolines; 2-heptadecenyl-4,5,5-trimethyl azolines; 2,4,5-triisobutyl azolines; 2-heptadecyl-4,4,5,5-tetramethyl azolines; 2-methyl-4-isoamyl-4-methyl azolines; 2-heptadecyl-4-propyl-5-methyl azolines; 2-heptadecenyl-4,4-dimethyl-5-isopropyl azolines; 2-decyl-4,4-dibutyl-5-methyl azolines; and 2-heptadecyl-5-methyl-5-ethyl azolines.

The maleic-adducts with which the azolines react by the process of this invention are those prepared by reacting maleic anhydride with an ester of a non-hydroxylated, non-conjugated, unsaturated, aliphatic, carboxylic acid and a monohydric or a polyhydric alcohol. The maleic-adducts are made by well-known processes such as those set forth, for example, in U. S. Patent No. 2,188,882 and in the literature cited above to which reference is hereby made. Following is a list of typical acids, the adducts of the esters of which react by the process of this invention: iso-decenoic, undecenoic, myristolenic, palmitolenic, oleic, iso-oleic, petroselic, erucic, brassidic, erucylacetic, geranic, linoleic, linolenic, and clupanodonic acids. Following is a list of typical alcohols, the adducts of the esters of which with the acids listed above react with azolines to form new imido-esters: methyl, ethyl, isopropyl, sec.-butyl, tert.-amyl, n-hexyl, 2-ethylhexyl, lauryl, octadecyl alcohols and the isomers of these; benzyl, p-butylbenzyl, cyclohexyl alcohols and the like; ethylene glycol, diethylene glycol, 1,6-hexandiol, butylene glycol; glycerol; pentaerythritol and the like. Thus, the reaction of the adducts of the esters of the unsaturated acids and polyhydric alcohols as well as monohydric alchohols is embraced by the reaction of this invention. In fact, a particularly preferred class of imido-esters consists of those made by reacting a maleic anhydride-adduct of a vegetable or animal oil with an azoline. These oils are the glyceryl esters of mixtures of saturated and unsaturated acids. The maleic-adducts of the following oils are operable: corn, olive, cottonseed, peanut, linseed, sunflower, safflower, hempseed, walnut, soybean, rapeseed, poppyseed, sesame, and perilla, as well as neat's-foot, salmon and whale oils.

In order for the compounds to be classed as operable maleic-adducts, they must obviously contain at least one anhydride group in each molecule. But there are many operable adducts which contain more than one such group in each molecule since the number of anhydride groups which can be added to an ester is proportional to the number of double bonds in all of the radicals of the esterified acids. Thus, for example, while only one anhydride group can be present in each molecule of the adduct of an oleic acid ester of a monohydric alcohol, there can be many more groups in each molecule of an adduct such as that of glyceryl linolenate. And each anhydride group in a molecule of an adduct is capable of reacting with one molecule of an azoline. So long as an adduct of an ester contains one anhydride group, it is not necessary that it contain its maximum potential number of anhydride groups in order to be operable and, in fact, it is often desirable, as in the case of the oil-adducts to have present fewer than the maximum number of anhydride groups so that the adduct will be free to polymerize on being heated. With this in mind, the maximum number of anhydride groups in a molecule of any adduct should not exceed six regardless of the degree of unsaturation of the original ester. Thus, the operable adducts are those of the esters of monohydric and polyhydric alcohols described above and the unsaturated fatty acids described above, which adducts contain from one to six anhydride groups. It will be noted in the following examples that the properties of a soybean oil-adduct containing two moles of reacted maleic anhydride per mole of oil are entirely changed by reaction with an azoline, even though this particular adduct contains a relatively small number of anhydride groups and much fewer than the maximum number which can be added to soybean oil.

The reaction between the azolines and the adducts takes place fairly readily and often exothermically. Reaction takes place even at room temperature (ca. 20° C.) especially when the azoline and adduct are dissolved in a volatile solvent and are deposited as a thin air-drying film. Heating of the reactants accelerates the rate of reaction and for this reason a minimum temperature of 50° C. is recommended. Temperatures up to 300° C. are operable but at the higher temperatures by-products and gels are frequently formed. Accordingly, an upper temperature of 250° C. is much preferred. When the product is to be isolated in bulk, the reactants are combined in a reactor; but this is not always necessary. For example, a mixture of the reactants, preferably in solution, can be applied to the surface of an object which it is desired to coat and protect, and the coated object can then be baked in an oven. During the baking period, the reactants combine to form the new imido-ester as a firm coating on the object. This procedure is especially effective in those cases where the azoline contains an unsaturated, long-chain substituent in the 2-position ($R^1$). For convenience in carrying out the reaction, inert solvents can be employed. Likewise, catalysts such as alcoholates, zinc chloride, and the like can be used, although ordinarily the reaction takes place rapidly enough in the absence of catalysts. Other expedients well-known to those skilled in the art, such as variations in pressure, solvent-extraction of the product, excess of one reactant, and the like, can be used without departing from the spirit of the invention.

It is evident from the schematic equation above that one mole of azoline combines with one anhydride group in the maleic anhydride adduct. The course of the reaction, therefore, is easily followed by titrating the reaction mixture with standard alkali since the alkali neutralizes the free and unreacted anhydride groups. Such is a conventional method of determining the acid number of resinous materials. As the reaction progresses by reaction of the azoline with the anhydride groups in the adduct, the acid number of the reaction mixture decreases. In some cases it is desirable to employ less than enough azoline to react with all of the anhydride groups in the adduct, and when such is the case the unreacted anhydride groups can be readily converted to salts, for example, by neutralization, or to esters by reaction with alcohols. Alternatively some of the anhydride groups can be neutralized or esterified first and the remainder then reacted with the azoline.

The following examples are presented in order to illustrate—and not to limit—this invention. The reaction of the oxazolines and thiazolines with the maleic anhydride adducts is ordinarily complete after two to about four hours of heating at about 150° C. to about 200° C. The reaction provides a large class of new imido-esters which have high molecular weight and which differ in degree from one another as regards the substitutents, $R$'s$^1$ to $^5$, on the azolines. All of the azolines, however, react in the same way provided they are free of substituents which react with acid anhydrides, particularly alcoholic hydroxyl groups and amino-hydrogen atoms, and one azoline can be substituted for another in the processes set forth in the following examples.

*Example 1*

An imido-ester derived from a maleic anhydride-adduct of soybean oil was prepared as follows: One mole of soybean oil was stirred and heated with 2.0 moles of maleic anhydride for 30 minutes at 150° C., then for 30 minutes at 200° C., and finally for three hours at 250° C. This adduct which was clear and homogeneous was then combined chemically with two moles of 2-heptadecadienyl-5-methyl oxazoline by heating and stirring the two reactants for two hours at 180° C. under a blanket of carbon dioxide. The product was a viscous oil which had an acid number of 8. Cobalt naphthenate drier, in an amount equivalent to 0.5% cobalt metal based on the imido-ester, was added and the film-characteristics of the product were compared with those of (a) soybean oil and (b) the soybean-maleic adduct, both containing the same ratio of drier as that added to the imido-ester. Films of the three materials were laid down on glass plates and were allowed to dry in air at room temperature. It was found that the film of the imido-ester as prepared above became dry and hard in three days and developed good resistance to xylene and acetone whereas the film of the adduct remained slightly tacky and had much less resistance to solvents, while the film of soybean oil was tacky and had far lower film strength and resistance to solvents. The same relationships held when the three materials, without drier, were baked for an hour at 150° C. It is evident that the conversion of the maleic-adduct to the imido-ester by reaction with the azoline results in a markedly distinct product when as few as two imido-ester groups are introduced into each molecule of oil.

*Example 2*

An adduct of linseed oil was made by heating and stirring 220 parts of linseed oil and 75 parts of maleic anhydride at 250° C. for four hours. To this adduct, in which the mōle-ratio of reacted maleic anhydride to oil was three to one, was added 245 parts of 2-heptadecadienyl-4,4-dimethyl oxazoline and this reaction mixture was heated for two hours at 190° C. in an inert atmosphere during which time the acid number of the product fell to 8. The product was compared with unmodified linseed oil and a linseed oil-maleic adduct, prepared as described above, and was found to dry more rapidly than either to dry, hard films having far superior solvent-resistance.

*Example 3*

An adduct from one mole of linseed oil (880 parts) and three moles of maleic anhydride was prepared by heating and stirring the two reactants for nine hours at 280° C. This adduct was much more viscous than the adduct prepared in Example 2 by virtue of the longer period of heating at the higher temperature. This adduct was then heated with three moles of 2-heptadecadienyl-5-methyl oxazoline for 2.5 hours at 200° C. during which time the acid number of the reaction product fell to 6. The product, a viscous oil, was diluted to a concentration of 80% in mineral thinner and was compared with a similar solution of unmodified linseed oil. The drying-rate and the film-characteristics of the product of this example were definitely superior to those of the unmodified oil.

*Example 4*

The procedure of Example 1 was followed with one exception; namely, that 2.0 moles of citraconic anhydride was substituted for the maleic anhydride. The product was essentially identical with the product of Example 1.

*Example 5*

In a similar manner, the adduct of 296 parts of methyl oleate and 98 parts of maleic anhydride was reacted at 170° C. for four hours with 264 parts of 2-heptadecyl oxazoline under a blanket of nitrogen. The product had an acid number of 4.3 indicating substantially complete reaction. This product can be employed as a modifier for rubber.

*Example 6*

The adduct of butyl undecylenate was prepared by heating and stirring one mole of n-butyl undecylenate and one mole of maleic anhydride for six hours at 180° C. The resultant adduct was then combined with one mole of 2-heptadecenyl-5-methyl oxazoline by heating at a temperature of 150° C. for four hours. The fluid product had an acid number of 2.7.

*Example 7*

Example 6 was repeated with one exception; namely, that a mole of 2-heptadecenyl-5-methyl thiazoline was substituted for the oxazoline. Again, there was obtained a fluid product which had an acid number 3.9 and which was employed as a modifier for rubber.

Thiazolines react with the maleic adducts of unsaturated aliphatic acid esters in the same way as do the corresponding oxazolines, and the products are substantially like those of the oxazolines, especially when the substituents on the azolines contain long carbon chains which tend to mask any differences between the sulfur and oxygen atoms.

*Example 8*

In order to illustrate the variety of azolines which react with the maleic-adducts according to the process of this invention and to illustrate the ease with which the reaction takes place, several azolines were heated with a maleic-adduct of soybean oil (reaction product of four moles of maleic anhydride and one mole of soybean oil) and with a maleic adduct of ethylene glycol dioleate (reaction product of 1.5 moles of maleic anhydride and one mole of glycol dioleate). In every case the amount of azoline employed was equivalent to the amount of anhydride in the adduct; and the reactants, azoline and adduct, were heated and stirred for three hours at 225° C. Every product had an acid number below 10 which indicates that the production of imido-ester was substantially complete. The following azolines were thus reacted with the two adducts: 2-butyl oxazoline and thiazoline; 2-heptyl-5-methyl oxazoline and thiazoline; 2-undecyl-5-methyl oxazoline and thiazoline; 2-phenyl-4-methyl oxazoline and thiazoline; 2-p-chlorophenyl oxazoline; 2-phenyl-4,4,5-trimethyl oxazoline; 2-p-nitrophenyl-5-ethyl oxazoline; 2-heptadecyl-5-methyl oxazoline and thiazoline; 2-heptadecenyl-5-methyl oxazoline and thiazoline; 2-heptadecadienyl-5-methyl oxazoline and thiazoline.

The products of this invention are all imido-esters and as such they have an unusual chemical structure which makes them valuable as intermediates for the production of other new compounds. In their own rights, the products which range from thin liquids to viscous oils have a wide variety of uses. Thus, they are eminently suited as additives for lubricating oils, as plasticizers for synthetic resins and cellulosic plastics, as modifiers for surface-coatings and as film-forming materials especially when the substituent represented by R' is unsaturated.

I claim:

1. A process for the preparation of new imido-esters, which comprises chemically combining, at a temperature from 20° C. to 300° C., (1) maleic anhydride-adducts of esters of non-conjugated, non-hydroxylated, unsaturated, aliphatic, carboxylic acids containing 10 to 24 carbon atoms, said adducts containing one to six anhydride groups per molecule, with (2) azolines of the general formula

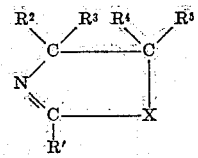

in which X represents an atom of an element from the class consisting of oxygen and sulfur; $R^2$, $R^3$, $R^4$ and $R^5$ represent members of the class consisting of hydrogen atoms and alkyl, aryl, aralkyl, alkaryl and cycloalkyl groups; and R' represents a member of the class consisting of alkyl, aryl, aralkyl, alkaryl and cycloalkyl groups and monounsaturated and diunsaturated aliphatic hydrocarbon groups containing not more than seventeen carbon atoms.

2. A process for the preparation of imido-esters, which comprises chemically combining, at a temperature of 50° C. to 250° C., a maleic anhydride-adduct of a non-conjugated, non-hydroxylated, unsaturated vegetable oil, which adduct contains one to six anhydride groups per molecule, with an azoline of the general formula

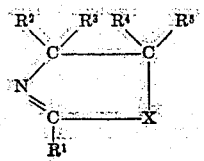

in which X represents an atom of an element from the class consisting of oxygen and sulfur; $R^2$, $R^3$, $R^4$ and $R^5$ represent members of the class consisting of hydrogen atoms and alkyl, aryl, aralkyl, alkaryl and cycloalkyl groups; and R' represents a member of the class consisting of alkyl, aryl, aralkyl, alkaryl and cycloalkyl groups and monounsaturated and diunsaturated aliphatic hydrocarbon groups containing not more than seventeen carbon atoms.

3. A process for the preparation of imido-esters, which comprises chemically combining, at a temperature of 50° C. to 250° C., a maleic anhydride-adduct of soybean oil, containing one to six anhydride groups per molecule, with 2-heptadecadienyl-5-methyl oxazoline.

4. A process for the preparation of imido-esters, which comprises chemically combining, at a temperature of 50° C. to 250° C., a maleic anhydride-adduct of linseed oil, containing one to six anhydride groups per molecule, with 2-heptadecadienyl-5-methyl oxazoline.

5. New compositions of matter as prepared by the process of claim 1.

6. New compositions of matter as prepared by the process of claim 2.

7. A new composition of matter as prepared by the process of claim 3.

8. A new composition of matter as prepared by the process of claim 4.

9. A process for the preparation of new imido-esters, which comprises chemically combining, at a temperature from 50° C. to 250° C., (1) maleic anhydride-adducts of esters of non-conjugated, non-hydroxylated, unsaturated, aliphatic, carboxylic acids containing 10 to 24 carbon atoms, said adducts containing one to six anhydride groups per molecule, with (2) azolines of the general formula

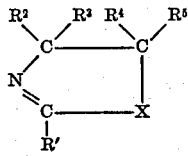

in which X represents an atom of an element from the class consisting of oxygen and sulfur; $R^2$, $R^3$, $R^4$ and $R^5$ represent members of the class consisting of hydrogen atoms and alkyl, aryl, aralkyl, alkaryl and cycloalkyl groups; and R' represents a member of the class consisting of alkyl, aryl, aralkyl, alkaryl and cycloalkyl groups, and monounsaturated and diunsaturated aliphatic hydrocarbon groups containing not more than seventeen carbon atoms.

10. A process for the preparation of imido-esters, which comprises chemically combining, at a temperature of 50° C. to 250° C., a maleic anhydride-adduct of soybean oil, containing one to six anhydride groups per molecule, with 2-heptadecenyl-5-methyloxazoline.

11. A process for the preparation of imido-esters, which comprises chemically combining, at a temperature of 50° C. to 250° C., a maleic anhydride-adduct of linseed oil, containing one to six anhydride groups per molecule, with 2-heptadecenyl-5-methyloxazoline.

12. A process for the preparation of imido-esters, which comprises chemically combining, at a temperature of 50° C. to 250° C., a maleic anhydride-adduct of methyl oleate with 2-heptadecyl-5-methyloxazoline.

13. New compositions of matter as prepared by the process of claim 10.

14. New compositions of matter as prepared by the process of claim 11.

15. New compositions of matter as prepared by the process of claim 12.

STANLEY P. ROWLAND.

No references cited.